(12) United States Patent
Palatini et al.

(10) Patent No.: US 10,942,498 B2
(45) Date of Patent: Mar. 9, 2021

(54) METHOD AND SYSTEM FOR REMOTE-CONTROLLED SERVICING OF A FIELD DEVICE OF PROCESS AUTOMATION

(71) Applicant: Endress+Hauser GmbH+Co. KG, Maulburg (DE)

(72) Inventors: Florian Palatini, Kleines Wiesental (DE); Tanja Haag, Schopfheim (DE)

(73) Assignee: Endress+Hauser GmbH+Co. KG, Maulburg (DE)

( * ) Notice: Subject to any disclaimer, the term of this patent is extended or adjusted under 35 U.S.C. 154(b) by 411 days.

(21) Appl. No.: 15/670,261

(22) Filed: Aug. 7, 2017

(65) Prior Publication Data

US 2018/0046162 A1 Feb. 15, 2018

(30) Foreign Application Priority Data

Aug. 12, 2016 (DE) ...................... 10 2016 115 013.4

(51) Int. Cl.
*G05B 19/042* (2006.01)
*H04L 12/12* (2006.01)
(Continued)

(52) U.S. Cl.
CPC ....... *G05B 19/0425* (2013.01); *G05B 19/042* (2013.01); *G06F 21/44* (2013.01);
(Continued)

(58) Field of Classification Search
None
See application file for complete search history.

(56) References Cited

U.S. PATENT DOCUMENTS

2005/0164684 A1  7/2005 Chen et al.
2012/0038458 A1* 2/2012 Toepke ................ G05B 19/042
                                                340/6.1
(Continued)

FOREIGN PATENT DOCUMENTS

CN     100592230 C    2/2010
CN     102902243 A    1/2013
(Continued)

OTHER PUBLICATIONS

Search Report for German Patent Application No. 10 2016 115 013.4, German Patent Office, dated Mar. 7, 2017, 7 pp.
(Continued)

*Primary Examiner* — Gregory J Toatley, Jr.
*Assistant Examiner* — Terence E Stifter, Jr.
(74) *Attorney, Agent, or Firm* — Kelly J. Smith; Endress+Hauser (USA) Holding Inc.

(57) ABSTRACT

The present disclosure includes a method and a system for remote-controlled servicing of a field device of process automation, including establishing a communication connection between a service unit and the field device via a first network, sending via a second network an access request from a computer unit to an application program executed on the service unit, wherein the application program serves for servicing the field device, approving the access request via the application program, and establishing access of the computer unit to the application program via the second network upon approval of the access request, wherein, after established access, the servicing of the field device occurs from the computer unit.

17 Claims, 1 Drawing Sheet

(51) Int. Cl.
*G06F 21/44* (2013.01)
*G06F 3/00* (2006.01)
*G06F 3/16* (2006.01)

(52) U.S. Cl.
CPC .... *H04L 12/12* (2013.01); *G05B 2219/24048* (2013.01); *G05B 2219/24058* (2013.01); *G05B 2219/25428* (2013.01); *G06F 3/005* (2013.01); *G06F 3/16* (2013.01); *Y02D 30/50* (2020.08)

(56) References Cited

U.S. PATENT DOCUMENTS

| | | | |
|---|---|---|---|
| 2013/0031249 A1 | 1/2013 | Gunzert et al. | |
| 2014/0089487 A1* | 3/2014 | Debate | H04L 67/025 709/223 |
| 2014/0179222 A1* | 6/2014 | Chaudhary | H04B 5/0031 455/41.1 |
| 2014/0181951 A1* | 6/2014 | Birkhofer | H04L 63/0218 726/12 |
| 2015/0287318 A1* | 10/2015 | Nair | G08C 17/02 340/5.52 |
| 2017/0163806 A1* | 6/2017 | Shanmugam | H04M 3/5183 |

FOREIGN PATENT DOCUMENTS

| | | |
|---|---|---|
| DE | 10358270 A1 | 8/2005 |
| DE | 102005058564 A1 | 7/2006 |
| DE | 102010042717 A1 | 4/2012 |
| DE | 102012108990 A1 | 5/2014 |
| DE | 102012112875 A1 | 7/2014 |
| DE | 102014105292 A1 | 11/2014 |
| DE | 102014116768 A1 | 5/2016 |
| WO | 2005101149 A2 | 10/2005 |

OTHER PUBLICATIONS

Search Report for European Patent Application No. 17182900.5, European Patent Office, dated Dec. 22, 2017, 7 pp.

* cited by examiner

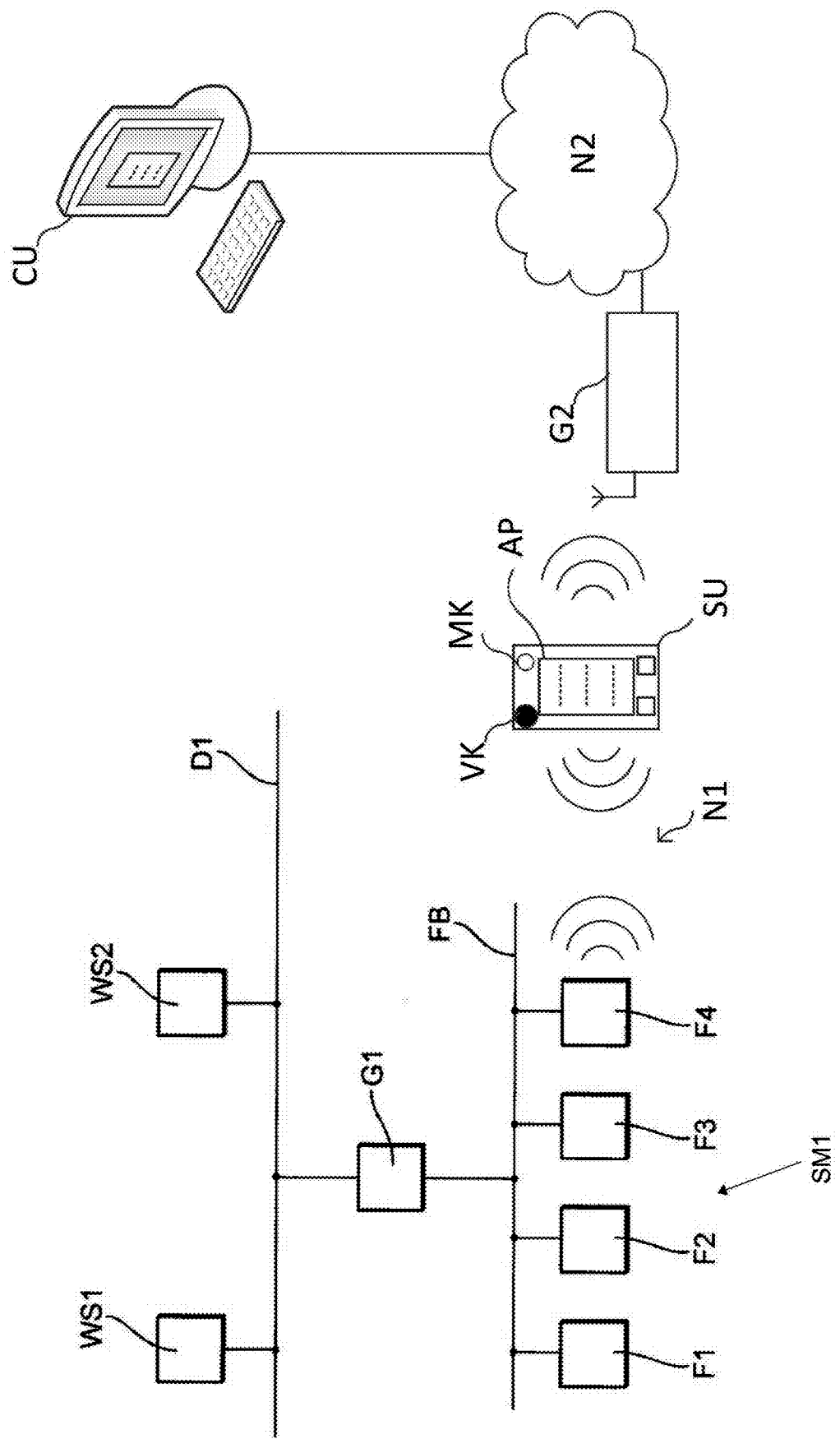

METHOD AND SYSTEM FOR REMOTE-CONTROLLED SERVICING OF A FIELD DEVICE OF PROCESS AUTOMATION

CROSS-REFERENCE TO RELATED APPLICATION

The present application is related to and claims the priority benefit of German Patent Application No. 10 2016 115 013.4, filed on Aug. 12, 2016, the entire contents of which are incorporated herein by reference.

TECHNICAL FIELD

The present disclosure relates to a method for remote-controlled servicing of a field device of process automation. Furthermore, the present disclosure relates to a system for performing the method of the present disclosure.

BACKGROUND

Known from the state of the art are field devices, which are used in industrial plants. In process automation technology, same as in manufacturing automation technology, field devices are often applied. Referred to as field devices are, in principle, all devices, which are applied near to the process and which deliver, or process, process relevant information. Thus, field devices are used for registering and/or influencing process variables. Serving for registering process variables are measuring devices, or sensors. These are used, for example, for pressure and temperature measurement, conductivity measurement, flow measurement, pH measurement, fill level measurement, etc. and register the corresponding process variables, pressure, temperature, conductivity, pH-value, fill level, flow, etc. Used for influencing process variables are actuators. These are, for example, pumps or valves, which can influence the flow of a liquid in a pipe or the fill level in a container. Besides the above mentioned measuring devices and actuators, understood as field devices are also remote I/Os, radio adapters, and, generally, devices, which are arranged at the field level. A large number of such field devices are produced and sold by the Endress+Hauser group.

In modern industrial plants, field devices are, as a rule, connected with superordinated units via communication networks, such as, for example, a fieldbus (Profi-Bus®, Foundation® Fieldbus, HART®, etc.). Normally, the superordinated units are control units, such as, for example, a PLC (programmable logic controller). The superordinated units serve, among other things, for process control, as well as for start-up of field devices. The measured values registered by the field devices, especially by their sensors, are transmitted via the particular bus system to a (or, in given cases, a number of) superordinated unit(s), which, in given cases, further process the measured values and forward them to the control room of the plant. The control room serves for process visualizing, process monitoring and process control via the superordinated units. Along with that, also data transmission from the superordinated unit via the bus system to the field devices is required, especially for configuration and parametering field devices as well as for operating actuators.

For servicing the field devices, corresponding operating programs (operating tools) are necessary, which either run self-sufficiently on the superordinated units (e.g., Endress+Hauser FieldCare, Pactware, AMS Fisher-Rosemount, PDM Siemens) or, however, also can be integrated in applications of the control room (e.g., Siemens PCS7, ABB Symphony, Emerson Delta V). The terminology, "servicing", means, among other things, a parametering of the field device, an updating of the field device and/or a querying and visualizing of process data and/or diagnostic data of the field device.

Before start-up and for maintenance during operation of the field device at the location of the field device user, the field device must be parametered. For parametering, especially for the reading and/or writing of parameters, servicing devices are applied. Such servicing devices communicate with the field device via an interface.

Newly used by the Endress+Hauser group with the product series "Micropilot FMR10/FMR20", which are radar based fill level measuring devices, is the application software (app) "SmartBlue". In the coming years, many other product series will likewise be able to use this application software. By means of SmartBlue, field devices can, in simple manner, be accessed using a mobile terminal, such as a smart phone or a tablet, via Bluetooth or WLAN. With help of this application software, process values of the field devices can be displayed and/or a parametering of the field devices performed.

The parametering of the field devices is, however, made difficult by the fact that the number of parameters per field device is often very large. Thus, some hundreds of parameters for a field device is no rarity. From the large number of parameters, a user must seek out the parameters suitable for its application and correspondingly parameter the device. If involved, moreover, is an automated plant, in which a large number of field devices are installed, then the servicing of the field devices involves a lot of effort.

Therefore, parametering in complex cases of application is not performed by the plant operator. For start-up or for maintenance purposes, for example, when a field device malfunctions, service technicians are requested from the local distributor, and the service technicians undertake the parametering for the plant operator. In case also the service technician in the case of maintenance cannot solve an occurring problem, then this requires support from service technicians of the device manufacturer.

All these cases require travel on the part of the service personnel, which can be expensive and time-consuming for the plant operator.

SUMMARY

Starting from this problem, an object of the present disclosure is to provide a method and a system, which permit servicing of a field device of process automation, without that the servicer must be located in the immediate vicinity of the field device.

The object is achieved by a method for remote-controlled servicing of a field device of process automation, comprising: establishing a communication connection between a service unit and the field device via a first network; sending via a second network an access request from a computer unit to an application program executed on the service unit, wherein the application program serves for servicing the field device; approving the access request via the application program; and establishing access of the computer unit to the application program via the second network upon approval of the access request, wherein, after established access, the servicing of the field device occurs from the computer unit.

A great advantage of the method of the present disclosure is that a servicer, for example, a service technician, does not have to be in the immediate vicinity of a field device in order to service it, but, instead, can make use of a "remote accessing" of the field device. The application program is mapped virtually to the computer unit of the servicer, inclusive of all functions of the application program. A plant operator seeking help connects on-site via its service unit with the field device. The servicer connects via its computer unit with the service unit, obtains an image of the application program on its computer unit and can with this image service the field device remotely. The image of the application program behaves identically to the application program on the service unit. If the servicer makes an input to the image of the application program, for example, the writing of a parameter value, then this input is processed in the application program of the service unit and a corresponding action, in this case, the writing of the mentioned parameter value to the field device, is initiated by the service unit.

Because the servicer, thus, for example, a service technician, does not have to be located in the direct vicinity of the field device, travel can be avoided by the servicer, this feature being advantageous for the plant operator and/or the servicer insofar as time and cost is concerned.

As regards the application program, it is for example an application, which is runnable on a mobile end-device. Such an application program is offered by the applicant under the mark, "SmartBlue".

Field devices, which are mentioned in connection with the method of the present disclosure, are described above, by way of example.

A preferred further development of the method of the present disclosure provides that the computer unit has a display unit, which is embodied for displaying information of the application program, wherein the information displayed on the display unit of the computer unit is at all times identical to information displayed on a display unit of the service unit. The display unit of the service unit is an LCD/LED, touch screen, a head-up display or a projector, while that of the computer unit is a monitor or, generally, a screen. The information can be available parameters, already set parameter values, measurement data, visualizing of measurement data, etc., however, also input fields and menu structures.

Also the user interface of the application program is mapped to the display unit of the computer unit. In such case, it is the exact image of the user interface displayed on the display unit of the service unit.

In an embodiment of the method of the present disclosure, it is provided that the access of the computer unit to the application program occurs with encryption. Sensitive information, such as, for example, parameter settings of a field device or current process values, can thereby be safely transmitted between computer unit and service unit.

In a further embodiment of the method of the present disclosure, it is provided that, for approval of the access, a password input in the application program and/or in the computer unit occurs. An establishing of unauthorized communication between service unit and computer unit is thereby prevented.

In a further development of the method of the present disclosure, it is provided that the accessing is limited to individual, earlier defined program parts of the application program. It can, for example, be provided that the servicer obtains access only to parameters, which are required for solution of a currently arisen problem. Moreover, the servicer obtains no access to other programs, settings or files of the service unit.

A further development of the method of the present disclosure provides that the servicing includes a parametering of the field device, an updating of the field device and/or a querying and visualizing of process data and/or diagnostic data of the field device.

In a further development of the method of the present disclosure, it is provided that the service unit by means of a video camera creates video recordings, which are transmitted to the computer unit, especially in real time. The servicer obtains access to the camera, however, only in the context of the application software. An access to private files, such as, for example, photo albums and the like, is not allowed.

In an additional further development of the method of the present disclosure, it is provided that the service unit by means of a microphone creates audio recordings, which are transmitted to the computer unit, especially in real time. In combination with the camera of the service unit, videotelephony between the plant operator and the service person can thereby be implemented, which can accelerate the problem solution. For example, the service person requests the plant operator to direct the camera toward the device to be serviced. From the transmitted video picture, the service person can see whether the field device has been correctly installed at the measuring point of the plant.

Furthermore, the object is achieved by a system for performing the method of the present disclosure, comprising: at least one field device of process automation; a service unit, on which an application program for servicing the field device and/or for displaying process- and/or diagnostic data of the field device is implemented and executed, wherein the service unit communicates with the field device via a first network; and a computer unit, which is embodied in such a manner that the computer unit communicates with the service unit via a second network and accesses the application program of the service unit in such a manner that the computer unit services the field device by means of the application program.

An embodiment of the system of the present disclosure provides that the service unit has a video camera, which the computer unit accesses. The video camera is preferably integrated in the service unit. Alternatively, the video camera is a separate unit and connected with the service unit by means of a cable or by means of radio.

Another embodiment of the system of the present disclosure provides that the service has unit a microphone, which the computer unit accesses. Alternatively, the microphone is a separate unit, for example, a headset, and is connected with the service unit by means of a cable or by means of radio.

In an embodiment of the system of the present disclosure, it is provided that the first network is a wireless network, especially a wireless network of limited range. In such case, is it especially a Bluetooth network. It can, however, also be any other wireless radio standard, such as, for example, WLAN, ZigBee, etc. It is likewise an option to establish the communication connection between the field device and the service unit via a wired network, especially via a serial data connection or via a fieldbus automation technology.

In an embodiment of the system of the present disclosure, it is provided that the second network is a wired network or a wireless network, especially the Internet. Examples for wireless networks are WLAN, GSM, LTE, UMTS, etc.

Both in the case of the first network as well as also in the case of the second network, it can be provided that other devices, such as a routers, proxies, gateways, etc. are located between the service unit and the field device, or between the service unit and the computer unit, or the first and/or the second network is formed by a combination of individual wireless and/or wired networks.

In a further development of the system of the present disclosure, it is provided that the computer unit is a computer unit of the device manufacturer. Especially, is it, in such case, a service PC, e.g. a laptop, a tablet, etc. at a helpdesk of the field device manufacturer. It can, however, also be a service PC of the local distributor or dealer. It is likewise an option that a service technician connects with the service unit while moving, for example, by means of its service laptop via a GSM connection.

In an embodiment of the system of the present disclosure, it is provided that the service unit is a mobile end-device. Especially, it is a smart phone, a tablet or data glasses, such as, for example, "Google Glass". It can, however, also be provided that the application program is executed on a laptop, or on a mobile service unit, such as a "Field Xpert" PDA produced and sold by the applicant.

BRIEF DESCRIPTION OF THE DRAWINGS

The present disclosure will now be explained in greater detail based on the appended drawing, the sole FIGURE of which shows as follows:

FIG. 1 shows an example of an embodiment of the method of the present disclosure.

DETAILED DESCRIPTION

FIG. 1 shows an example of an embodiment of the method of the present disclosure based on plant automation technology. Connected to a data bus D1 are a number of work station PCs (personal computers), WS1, WS2, as a rule, at the plant level. These work station PCs serve as superordinated units (control systems, respectively control units), among other things, for process visualizing, process monitoring and for engineering such as for servicing and monitoring field devices. The data bus D1 works, e.g., according to the Profibus DP standard or according to the HSE (High Speed Ethernet) standard of Foundation Fieldbus. Via a gateway G1, which is also referred to as a linking device, field controller or segment coupler, the data bus D1 is connected with a fieldbus segment SM1. The fieldbus segment SM1 is composed of a number of field devices F1, F2, F3, F4, which are connected with one another via a fieldbus FB. The field devices F1, F2, F3, F4 can be sensors or actuators. The fieldbus FB works according to one of the known fieldbus standards, e.g., Profibus, Foundation Fieldbus or HART.

If there is a problem with one of the field devices F1, F2, F3, F4, or should a new field device be put in operation, then the plant operator contacts the helpdesk of the field device manufacturer or of the distributor. Usually, then, a service technician is ordered to the plant, in order to take care of the problem. The method of the present disclosure offers a comfortable opportunity for avoiding the costs associated with this procedure.

In order to service a field device F4 by means of the method of the present disclosure, in a first method step, a communication connection between the field device F4 and a service unit SU is established via a first network N1. The service unit SU in this example of an embodiment is a smart phone. Other options include that the service unit SU is a tablet, a laptop, the Endress+Hauser "Field Xpert" PDA or a data glasses, such as, for example, "Google Glass."

The wireless network is Bluetooth. It can, however, also be any other wireless network, for example, a wireless network of limited range. It is likewise an option to establish the communication connection between the field device and the service unit via a wired network, for example, via a serial data connection or via the fieldbus FB of automation technology. For example, the service unit SU can be connected directly to the fieldbus FB and communicate via this with the field device F4.

Integrated into the service unit SU is an application program AP, which runs on the service unit SU. The application program AP is the app "SmartBlue", which is sold by the applicant. This app enables the servicing of the field device F4, for example, process values can be visualized and the field device F4 can be parametered.

Furthermore, the service unit SU is connected with a second network N2, the Internet. The accessing of this occurs wirelessly by means of WLAN via a router/gateway G2, which is connected with the Internet N2 via a cable. Alternatively, the service unit SU is connected with the Internet N2 via mobile radio, for example, by means of UMTS, GSM, or LTE.

In a second method step, a computer unit CU sends via Internet an access request to the application program AP. The computer unit CU is a service PC at a helpdesk of the device manufacturer or a PC of a service technician of the customer. The access request occurs encrypted. The application program AP after obtaining the access request shows a dialogue box for approving the access request.

In a third method step, the plant operator, who is operating the service unit SU, approves the access request. Alternatively or supplementally, a password can be required at the service unit SU or at the computer unit CU. After approval of the access request, in a fourth and last method step, a communication connection between the service unit SU and the computer unit CU via the Internet N2 is established. The computer unit CU now accesses the application program AP. In such case, the application program AP is mapped virtually to the computer unit CU, in that the user interface of the application program AP is mapped onto the display unit of the computer unit CU. Involved here is the exact image of the user interface, which appears on the display unit of the service unit SU.

If now an input is made to the image of the application program AP on the computer unit CU, for example, the writing of a parameter value, then this input is processed by the application program AP of the service unit SU and the corresponding action, thus the writing of the parameter value to the field device F4, taken by the service unit SU.

Via a microphone MK implemented in the service unit SU, the plant operator can speak with the service person of the helpdesk. For this, the application program AP grants the servicer at the computer unit CU access to the microphone. Also here, a request for approval of the plant operator, who is running the service unit SU, can occur.

By means of a video camera VK installed in the service unit SU, a video chat can occur supplementally. For this, the application program AP grants the servicer at the computer unit CU access to the video camera VK of the service unit. Also here, a request for approval of the plant operator, who is running the service unit SU, can occur. Also an option is that the plant operator is requested by the service person to orient the service unit SU in a certain position, in order to obtain a video of the locational conditions or relative to the installation of the field device F4 in the plant.

With help of the method of the present disclosure, it is, thus, possible, to service a field device F1, F2, F3, F4, without the servicer having to be in the immediate vicinity of the field device F1, F2, F3, F4. Understood under the concept "servicing" is, among other things, a parametering of the field device, an updating of the field device and/or a querying and visualizing of process data and/or diagnostic data of the field device.

The method of the present disclosure and the system of the present disclosure are applicable to any type and number of field devices F1, F2, F3, F4 and not limited to the examples of embodiments shown in FIG. 1.

The invention claimed is:

1. A method for remote-controlled servicing of a field device of process automation, comprising:
   establishing a communication connection between a service unit and the field device via a first network;
   sending via a second network an access request from a computer unit to an application program executed on the service unit, wherein the application program enables servicing of the field device;
   approving the access request via the application program;
   establishing access of the computer unit to the application program via the second network upon approval of the access request;
   obtaining an image of the application program on the computer unit; and
   after establishing access, servicing the field device from the computer unit by making input to the image of the application program on the computer unit, processing the input by the application program of the service unit and taking a corresponding action on the field device by the service unit.

2. The method of claim 1, wherein the computer unit has a display unit embodied to display information of the application program, wherein the information displayed on the display unit of the computer unit is at all times identical to information displayed on a display unit of the service unit.

3. The method of claim 1, wherein the access of the computer unit to the application program occurs with encryption.

4. The method of claim 1, wherein for approval of the access request a password is input in the application program and/or in the computer unit.

5. The method of claim 1, wherein the access is limited on individual, pre-defined program parts of the application program.

6. The method of claim 1, wherein the servicing includes a parametering of the field device, an updating of the field device and/or a querying and visualizing of process data and/or diagnostic data of the field device.

7. The method of claim 1, wherein the service unit includes a video camera to create video recordings, and the method further comprises transmitting the video recordings to the computer unit in real time via the service unit.

8. The method of claim 1, wherein the service unit includes a microphone to create audio recordings, and the method further comprises transmitting the audio recordings to the computer unit in real time via the servicing unit.

9. A system for remote-controlled servicing of a field device of process automation, comprising:
   at least one field device of process automation;
   a service unit on which an application program for servicing the field device and/or for displaying process and/or diagnostic data of the field device is implemented and executed, wherein the service unit communicates with the field device via a first network; and
   a computer unit embodied such that the computer unit communicates with the service unit via a second network and accesses the application program of the service unit such that the computer unit services the field device via the application program, wherein an image of the application program is obtained on the computer unit, and wherein the field device is serviced from the computer unit by making input to the image of the application program on the computer unit, processing the input by the application program of the service unit and taking a corresponding action on the field device by the service unit.

10. The system of claim 9, wherein the service unit includes a video camera that can be accessed by the computer unit.

11. The system of claim 9, wherein the service unit has a microphone that can be accessed by the computer unit.

12. The system of claim 9, wherein the first network is a wireless network.

13. The system of claim 12, wherein the first network is a wireless network of limited range.

14. The system of claim 9, wherein the second network is a wired network or a wireless network.

15. The system of claim 14, wherein the second network is the Internet.

16. The system of claim 9, wherein the computer unit is a computer unit of a field device servicer.

17. The system of claim 9, wherein the service unit is a mobile end-device.

* * * * *